(12) United States Patent
Bessho et al.

(10) Patent No.: US 10,309,440 B2
(45) Date of Patent: Jun. 4, 2019

(54) CAP AND SECURING STRUCTURE PART USING CAP

(71) Applicant: MITSUBISHI HEAVY INDUSTRIES, LTD., Tokyo (JP)

(72) Inventors: Masahiro Bessho, Tokyo (JP); Naomoto Ishikawa, Tokyo (JP); Nobuyuki Kamihara, Tokyo (JP); Yuichiro Kamino, Tokyo (JP); Hisashi Tanaka, Tokyo (JP); Takahisa Masukawa, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 247 days.

(21) Appl. No.: 15/126,466

(22) PCT Filed: Mar. 5, 2015

(86) PCT No.: PCT/JP2015/056501
§ 371 (c)(1),
(2) Date: Sep. 15, 2016

(87) PCT Pub. No.: WO2015/146528
PCT Pub. Date: Oct. 1, 2015

(65) Prior Publication Data
US 2017/0082131 A1 Mar. 23, 2017

(30) Foreign Application Priority Data

Mar. 24, 2014 (JP) ................... 2014-060244

(51) Int. Cl.
F16B 37/14 (2006.01)
F16B 33/00 (2006.01)
(Continued)

(52) U.S. Cl.
CPC ........ *F16B 33/004* (2013.01); *B29C 45/2618* (2013.01); *B29C 45/2622* (2013.01);
(Continued)

(58) Field of Classification Search
CPC ...... F16B 37/17; F16B 33/004; F16B 11/006; F16B 37/14
(Continued)

(56) References Cited

U.S. PATENT DOCUMENTS 972,140 A * 10/1910 Adam ................. F16B 37/14
122/493
3,485,134 A 12/1969 Ott
(Continued)

FOREIGN PATENT DOCUMENTS

DE  102012202053 A1  8/2013
JP  H07-101457 A     4/1995
(Continued)

OTHER PUBLICATIONS

PCT, "International Search Report for International Application No. PCT/JP2015/056501" dated May 26, 2015.
(Continued)

*Primary Examiner* — Flemming Saether
(74) *Attorney, Agent, or Firm* — Manabu Kanesaka; Ben Hauptman; Ken Berner

(57) ABSTRACT

A cap is applied to a securing structure part for securing structure elements using a fastener passed through through-holes formed in the structure elements, and a collar fastened to the tip part of the fastener. A filler engaging part for engaging a cured filler, configured with a female thread that turns about a center axis, is formed on the inner peripheral surface of the cap. The filler engaging part includes a first helical engagement part formed in the region near the cap inner part of the inner peripheral surface in the center axis
(Continued)

direction; and a second helical engagement part formed in the region near the cap opening-end part in the center axis direction, the inner diameter of the second helical engagement part being greater than that of the first helical engagement part, and having a helical direction that is opposite to that of the first helical engagement part.

4 Claims, 10 Drawing Sheets

(51) Int. Cl.
*B64D 45/02* (2006.01)
*B29C 45/26* (2006.01)
*B29L 31/00* (2006.01)

(52) U.S. Cl.
CPC .............. *B64D 45/02* (2013.01); *F16B 37/14* (2013.01); *B29C 45/262* (2013.01); *B29L 2031/727* (2013.01)

(58) Field of Classification Search
USPC ............ 411/377, 372.5, 372.6, 373, 82, 82.1
See application file for complete search history.

(56) References Cited

U.S. PATENT DOCUMENTS

| | | | | |
|---|---|---|---|---|
| 4,557,654 A | * | 12/1985 | Masuda | ................. F16B 37/14 411/373 |
| 4,826,380 A | | 5/1989 | Henry | |
| 4,905,931 A | | 3/1990 | Covey | |
| 5,667,281 A | * | 9/1997 | Ladouceur | ................ B60B 7/14 301/37.375 |
| 5,752,795 A | * | 5/1998 | D'Adamo | ............... F16B 37/14 411/373 |
| 6,135,691 A | | 10/2000 | Nadarajah et al. | |
| 6,273,658 B1 | * | 8/2001 | Patterson | .................. B60B 3/16 301/37.374 |
| 7,802,951 B2 | * | 9/2010 | Houck | .................. F16B 13/141 411/416 |
| 9,618,029 B2 | * | 4/2017 | Cameron | ................ F16B 37/14 |
| 2009/0126973 A1 | | 5/2009 | Martin Hernandez | |
| 2011/0070053 A1 | * | 3/2011 | Chang | ..................... F16B 37/14 411/429 |
| 2011/0181393 A1 | | 7/2011 | Tillotson et al. | |
| 2012/0074257 A1 | | 3/2012 | Bessho et al. | |
| 2013/0223951 A1 | | 8/2013 | Bessho et al. | |
| 2014/0373359 A1 | | 12/2014 | Schomaker et al. | |
| 2015/0344151 A1 | | 12/2015 | Bessho et al. | |

FOREIGN PATENT DOCUMENTS

| | | |
|---|---|---|
| JP | 2002-266832 A | 9/2002 |
| JP | 2010-254287 A | 11/2010 |
| JP | 2012-232660 A | 11/2012 |
| JP | 2012-232692 A | 11/2012 |
| JP | 2013-518320 A | 5/2013 |
| JP | 5634598 B2 | 12/2014 |
| WO | 2012/147645 A1 | 11/2012 |

OTHER PUBLICATIONS

PCT, "Written Opinion of the International Searching Authority for International Application No. PCT/JP2015/056501".

Europe Patent Office, "Search Report for European Patent Application No. 15768941.5," dated Mar. 14, 2017.

* cited by examiner

CAP AND SECURING STRUCTURE PART USING CAP

RELATED APPLICATIONS

The present application is National Phase of International Application No. PCT/JP2015/056501 filed Mar. 5, 2015, and claims priority from Japanese Application No. 2014-060244, filed Mar. 24, 2014, the disclosure of which is hereby incorporated by reference herein in its entirety.

TECHNICAL FIELD

The present invention relates to a resin cap mounted to cover a fastener, a cap mold, a securing structure part using a cap, and a method for mounting a cap in a securing structure part which secures overlapping structure elements of an aircraft using the fastener.

BACKGROUND ART

For example, an airframe of an aircraft is configured of a metal material such as aluminum alloy or a composite material such as Carbon Fiber Reinforced Plastic (CFRP), and structure elements are secured to each other by a securing structure part using multiple fasteners. As an example of the securing structure part, a securing structure part is known, in which a through hole is formed in overlapping multiple structure elements, a metal fastener passes through the through-hole, and the multiple structure elements are secured to each other by fastening a nut-shaped collar to the tip part of the fastener.

In addition, a resin cap may be provided to surround the tip part of the fastener and the collar. In a case where the aircraft is struck by lightning, the cap is used to prevent sparks from occurring in a portion between the structure elements and the metal fastener or collar. Particularly, in a case where the tip part of the fastener or the collar is positioned on the inner surface side of a fuel tank, the cap is effectively used.

PTL 1 discloses a securing structure part which uses this cap. In PTL 1, occurrence of sparks is prevented by enclosing gas inside the cap.

In the cap disclosed in PTL 1, since the cap is secured only by coating the outer periphery of the cap with a sealant, the reliability of securing the cap is insufficient, and there is a concern that the cap may fall off.

Particularly, during operation of an aircraft, the aircraft is subjected to severe temperature variation in which the airplane is subjected to high temperatures (for example, 100° C.) on the ground and is subjected to low temperatures (for example, −60° C.) when the airplane is flying. Accordingly, especially in a case where temperature variation occurs, it is necessary to secure the cap such that the cap does not fall off.

Meanwhile, PTL 2 and PTL 3 disclose inventions in which a fastener and a cap are directly screwed to each other to be secured. Specifically, the inventions are disclosed in which a female thread part which is screwed to a male thread part on the tip of the fastener is formed on the inner periphery of the cap, and the cap is secured by screwing the tip of the fastener to the cap.

CITATION LIST

Patent Literature

[PTL 1] U.S. Pat. No. 4,905,931
[PTL 2] U.S. Pat. No. 6,135,691
[PTL 3] Japanese Unexamined Patent Application Publication No. 2010-254287

SUMMARY OF INVENTION

Technical Problem

However, in the structure in which the cap is secured by directly screwing the cap to the tip part of the fastener, it is necessary to extend the tip part of the fastener and screw the cap to the male thread part of the extended part. That is, a fastener having a special size which is longer than the length of an existing fastener is used, and a cost increases. Since the tip part of the fastener is extended, a dimension in an axis direction of the cap covering the tip part increases, and the risk of interference between the cap and the structure element around the cap increases, and there is problem that weight increases.

In the caps disclosed in PTL 2 and PTL 3, each cap is very favorably secured to the fastener, and it is possible to prevent the cap from falling off. However, the cap is used for a long time period, a screw connection may loosen, and there is a concern that the cap may fall off from the fastener.

A portion between the fastener and the cap is filled with a curable filler (sealant or the like), and lightning resistance is improved and loosening of the cap is prevented by adhesion-coupling the fastener and the cap. However, an expensive material having improved adhesiveness between the cap and the filler needs to be selected as a material of the cap, or processing (blast processing, embossing processing, or the like) for increasing adhesion on the surface of the cap needs to be performed, and thus, a manufacturing cost of the cap increases.

Meanwhile, as described above, since the portion between the fastener and the cap is filled with the filler, when the cap is mounted on the fastener, in most cases, the filler filling the inside of the cap protrudes toward the outside and is attached to the periphery of the cap.

For example, if the filler is attached to the periphery of the cap provided on the inner surface side of the fuel tank, the attached filler peels off into the fuel tank and may enter a fuel filter along with fuel, and there is a concern that the fuel filter may become clogged. Accordingly, a large number of caps are checked in order to wipe off the attached filler, and a large number of man-hours are required for the wiping operation.

The present invention is made in consideration of the above-described circumstances, and an object thereof is to provide a cap which can be prevented from falling off from the fastener, a cap mold, and a securing structure part using the cap, in which the structures thereof are simple and have improved productivity and low manufacturing costs.

Another object thereof is to provide a method for mounting a cap capable of preventing the filler, which protrudes from the cap when the cap is mounted on the fastener using the filler, from being attached to the periphery of the cap.

Solution to Problem

The present invention adopts the following means in order to achieve the above objects.

According to a first aspect of the present invention, there is provided a cap which is applied to a securing structure part for securing structure elements using a fastener which passes through a through-hole formed in overlapping multiple structure elements of an aircraft and a collar which is fastened to a tip part of the fastener protruding from the surface of the structure elements, and which is mounted to surround the tip part of the fastener and the collar, in which the cap is mounted in a non-engaged state with respect to the tip part of the fastener and the collar, a filler engaging part which is formed on the inner peripheral surface of the cap, has a female threaded helical shape which turns about the center axis of the cap, and engages with a filler which fills a space formed between the inner peripheral surface, and the fastener, the collar, and the surface of the structure element and is cured, and the filler engaging part includes: a first helical engagement part which is formed in a region near a cap inner part of the inner peripheral surface in the center axis direction; and a second helical engagement part which is formed in a region near a cap opening-end part of the inner peripheral surface in the center axis direction, has a greater inner diameter than that of the first helical engagement part, and has a helical direction which is opposite to that of the first helical engagement part.

According to the cap having the above-described configuration, after the cap is mounted in the non-engaged state with respect to the tip part of the fastener and the collar, the female threaded filler engaging part formed on the inner peripheral surface of the cap engages with the filler, and it is possible to mechanically connect the cap and the filler.

Accordingly, unlike in the related art, it is not necessary to directly screw the cap to the fastener of a special size having an extended tip part so as to secure the cap to the fastener, and an existing short fastener can be used. Therefore, an increase in cost or an increase in weight is prevented, and it is possible reduce the risk of interference between the cap and the structure element around the cap. A sealant can be exemplified as the filler. However, an adhesive agent may be the sealant.

The female threaded filler engaging part formed on the inner peripheral surface of the cap includes the first helical engagement part which is formed in the region near the cap inner part and the second helical engagement part which is formed in the region near the opening-end part of the cap, and the helical direction of the second helical engagement is opposite to that of the first helical engagement part. That is, for example, the first helical engagement part is a left-hand screw (reverse screw), and the second helical engagement part is a right-hand screw (normal screw). The right and left relationship between the two screws may be opposite to the above-described relationship.

If the filler filling the inside of the cap is cured, the first male thread portion which is screwed to the first helical engagement part of the cap and the second male thread portion which is screwed to the second helical engagement part are integrated. In this state, for example, if the first helical engagement part of the cap turns in a loosening direction with respect to the first male thread part of the filler, simultaneously, the second helical engagement part of the cap turns in a fastening direction with respect to the second male thread portion of the filler. In a case where the rotation directions are opposite to the above-described rotation directions, the above-described factors are similarly generated. Accordingly, the cap cannot rotate in both the forward direction and the backward direction with respect to the cured filler, and thus, it is possible to reliably prevent loosening of the cap.

Since the inner diameter of the second helical engagement part which is formed in the region near the opening-end part of the cap is greater than the inner diameter of the first helical engagement part which is formed in the region near the cap inner part, it is possible to easily extract the core mold by which the first helical engagement part is molded without interference between the core mold and the second helical engagement part when the cap is molded, and productivity is improved.

Accordingly, the structure of the cap is simple, productivity thereof is improved, a manufacturing cost thereof is low, and it is possible to provide the cap which can be prevented from falling off from the fastener.

In the cap having the above-described configuration, preferably, at least one of the first helical engagement part and the second helical engagement part is a tapered threaded part in which the inner diameter increases toward the opening-end part side of the cap, and the minimum inner diameter of the second helical engagement part is equal to or more than the maximum inner diameter of the first helical engagement part.

In this way, since the first helical engagement part and the second helical engagement part are tapered threaded parts, after the cap which is an injection-molded article is molded, it is possible to easily extract the core mold by which the first helical engagement part and the second helical engagement part are molded, and it is possible to increase productivity with respect to the cap.

In the cap having the above-described configuration, preferably, at least one of the first helical engagement part and the second helical engagement part has multiple threads.

In this way, since the first helical engagement part and the second helical engagement part have multiple threads, after the cap is injection-molded, it is possible to easily extract the core molds of the first helical engagement part and the second helical engagement part. This is because leading angles of the helical engagement parts having multiple threads are steep and the core molds can be extracted at small rotation angles. Accordingly, it is possible to further improve productivity with respect to the cap.

According to a second aspect of the present invention, there is provided a cap mold for injection-molding the cap according to the first aspect, including: an outer mold which molds an outer peripheral surface of the cap; a first male threaded core mold which molds the first helical engagement part; and a second male threaded core mold which molds the second helical engagement part, in which the second core mold is coaxially disposed with the first core mold in a direction extracted from the first core mold and can be extracted from the cap ahead of the first core mold in a state where the first core mold remains after the cap is injection-molded, and the first core mold is extracted after the second core mold is extracted.

In a case where the cap is injection-molded using the mold, after the first core mold and the second core mold are incorporated inside the outer mold and molding is performed by injecting a resin material, first, the second core mold positioned near to the opening-end part of the cap may be rotated in a predetermined rotation direction so as to be extracted from the cap, and subsequently, the first core mold positioned near to the inner part (rear part) of the cap may be rotated in the direction opposite to the rotation direction of the second core mold so as to be extracted from the cap.

In this way, the first helical engagement part and the second helical engagement part having helical directions different from each other can be simultaneously molded in the cap, and it is possible to increase productivity with respect to the cap. In addition, since the second core mold is coaxially disposed with the first core mold, it is possible to accurately form the first helical engagement part and the second helical engagement part of the cap to be coaxial with each other.

According to a third aspect of the present invention, there is provided a cap which is applied to a securing structure part for securing structure elements using a fastener which passes through a through-hole formed in overlapping multiple structure elements of an aircraft and a collar which is fastened to a tip part of the fastener protruding from the surface of the structure elements, and which is mounted to surround the tip part of the fastener and the collar, including: a cap engagement washer which is interposed between the surface of the structure elements and the collar, and has a periphery in which a male threaded helical engagement part is provided; and a cap body which is mounted in a non-engaged state with respect to the tip part of the fastener and the collar, and has a female threaded helical engagement part which is formed on the inner peripheral surface near an opening-end part of the cap body and is screwed to the male helical engagement part of the cap engagement washer.

According to the cap having the above-described configuration, the cap body is mounted on the fastener, the collar, and the cap engagement washer, the female helical engagement part of the cap body and the male helical engagement part of the cap engagement washer engage with each other by twisting the cap body, and it is possible to secure the cap body to the fastener.

Since the cap body engages with only the cap engagement washer and does not engage with the fastener and the collar, unlike in the related art, it is not necessary to directly screw the cap to the fastener of a special size having an extended tip part so as to secure the cap to the fastener, and an existing short fastener can be used. Therefore, an increase in cost or an increase in weight is prevented, and it is possible reduce the risk of interference between the cap body and the structure element around the cap body, and it is possible to prevent the cap body from falling off from the fastener by a simple and inexpensive configuration.

Since the cap body engages with the cap engagement washer and simultaneously, the cap body is coaxially positioned and secured to the fastener and the collar, in a case where the inside of the cap body is filled with the filler, it is not necessary to hold the cap body until the filler is cured. Accordingly, it is possible to prevent the cap body from deviating from the axis with respect to the fastener during curing of the filler, or from falling off from the fastener, and it is possible to significantly improve mounting workability of the cap body.

In the cap having the above-described configuration, preferably, a filler engaging part, which engages with a filler which fills a space formed between the fastener and the collar, and the surface of the structure elements and is cured, is formed on an inner peripheral surface closer to the inner part of the cap body than the female helical engagement part, and the filler engaging part has a female threaded helical shape which turns about the center axis of the cap body and has a helical direction opposite to that of the female helical engagement part.

In this way, by forming the filler engaging part engaging with the filler on the inner peripheral surface of the cap body, the filler engaging part engages with the cured filler agent. In this state, for example, if the female helical engagement part of the cap body turns in a loosening direction with respect to the male helical engagement part of the cap engagement washer, the filler engaging part of the cap body turns in a fastening direction with respect to the cured filler agent. The opposite case also is similar. Accordingly, the cap body cannot rotate in both the forward direction and the backward direction with respect to the fastener and collar, and thus, it is possible to reliably prevent loosening of the cap body.

In the cap having the above-described configuration, preferably, the male helical engagement part of the cap engagement washer and the female helical engagement part of the cap body have multiple threads.

In this way, since the male helical engagement part and the female helical engagement part have multiple threads, it is possible to decrease the rotation angle of the cap body when the cap body is attached to the cap engagement washer, and it is possible to improve attachment/detachment properties of the cap body.

According to a fourth aspect of the present invention, there is provided a securing structure part which includes a fastener which passes through a through-hole formed in overlapping multiple structure elements of an aircraft, a collar which is fastened to a tip part of the fastener protruding from the surface of the structure elements, and a cap which is mounted to surround the tip part of the fastener and the collar, and which secures the structure elements using the fastener and the collar, in which the cap is mounted in a non-engaged state with respect to the tip part of the fastener and the collar, a filler engaging part is formed on the inner peripheral surface of the cap, and the filler engaging part has a female threaded helical shape which turns about the center axis of the cap, and engages with a filler which fills a space formed between the inner peripheral surface, and the fastener, the collar, and the surface of the structure element and is cured, and the filler engaging part includes: a first helical engagement part which is formed in a region near a cap inner part of the inner peripheral surface in the center axis direction; and a second helical engagement part which is formed in a region near a cap opening-end part of the inner peripheral surface in the center axis direction, has a greater inner diameter than that of the first helical engagement part, and has a helical direction which is opposite to that of the first helical engagement part.

According to the securing structure part having the above-described configuration, it is possible to obtain effects similar to those of the cap according to the above-described first aspect of the present invention.

According to a fifth aspect of the present invention, there is provided a securing structure part which includes a fastener which passes through a through-hole formed in overlapping multiple structure elements of an aircraft, a collar which is fastened to a tip part of the fastener protruding from the surface of the structure elements, and a cap which is mounted to surround the tip part of the fastener and the collar, and which secures the structure elements using the fastener and the collar, in which the cap includes: a cap engagement washer which is interposed between the surface of the structure elements and the collar, and has a periphery in which a male threaded helical engagement part is provided; and a cap body which is mounted in a non-engaged state with respect to the tip part of the fastener and the collar, and has a female threaded helical engagement part which is formed on the inner peripheral surface near an opening-end part of the cap body and engages with the male helical engagement part of the cap engagement washer.

According to the securing structure part having the above-described configuration, it is possible to obtain effects similar to those of the cap according to the above-described third aspect of the present invention.

According to a sixth aspect of the present invention, there is provided a method for mounting a fastener which passes through a through-hole formed in overlapping multiple structure elements of an aircraft, a collar which is fastened to a tip part of the fastener protruding from the surface of the structure elements, and a cap which is mounted to surround the tip part of the fastener and the collar and in which a portion between the tip part of the fastener and the collar is filled with a filler, including: a masking member mounting step of mounting a masking member for masking an outer peripheral surface of the cap; a filler filling step of filling the inside of the cap with the filler; a cap mounting step of mounting the cap on the tip part of the fastener and the collar; and a masking member removal step of removing the masking member from the cap.

According to the method for mounting a cap having the above-described configuration, when the cap filled with the filler agent is mounted on the fastener and the collar, even when the filler filling the inside of the cap protrudes toward the outside, the protruded filling agent is attached to the masking member which is mounted on the outer peripheral surface of the cap. In this way, it is possible to remove the masking member, to which the filler agent is attached, for each masking member from the cap after the cap is mounted on the fastener and the collar.

Accordingly, when the cap is mounted on the fastener using the filler, unlike in the related art, it is not necessary to carefully wipe off the filler protruding from the cap, and it is possible to decrease the required number of man-hours.

As the masking member, it is possible to use a thick resin sleeve which can be repeatedly used, or a disposable film sleeve which is thin and inexpensive. Since mounting and removal of the masking member with respect to the cap are simple operations, a large number of man-hours is not required. Accordingly, it is possible to inexpensively and easily prevent the cap from becoming dirty.

Advantageous Effects of Invention

As described above, according to the cap, the cap mold, and the securing structure part using the cap of the present invention, the structures thereof are simple and have improved productivity and low manufacturing cost, and it is possible to prevent the cap from falling off from the fastener.

According to the method for mounting a cap of the present invention, when the cap is mounted on the fastener using the filler, it is possible to easily prevent the filler, which protrudes from the cap, from being attached to the periphery of the cap.

DESCRIPTION OF EMBODIMENTS

Hereinafter, multiple embodiments of the present invention will be described.

[First Embodiment]

First, a first embodiment of the present invention will be described with reference to FIGS. 1 to 9.

Figure 1:
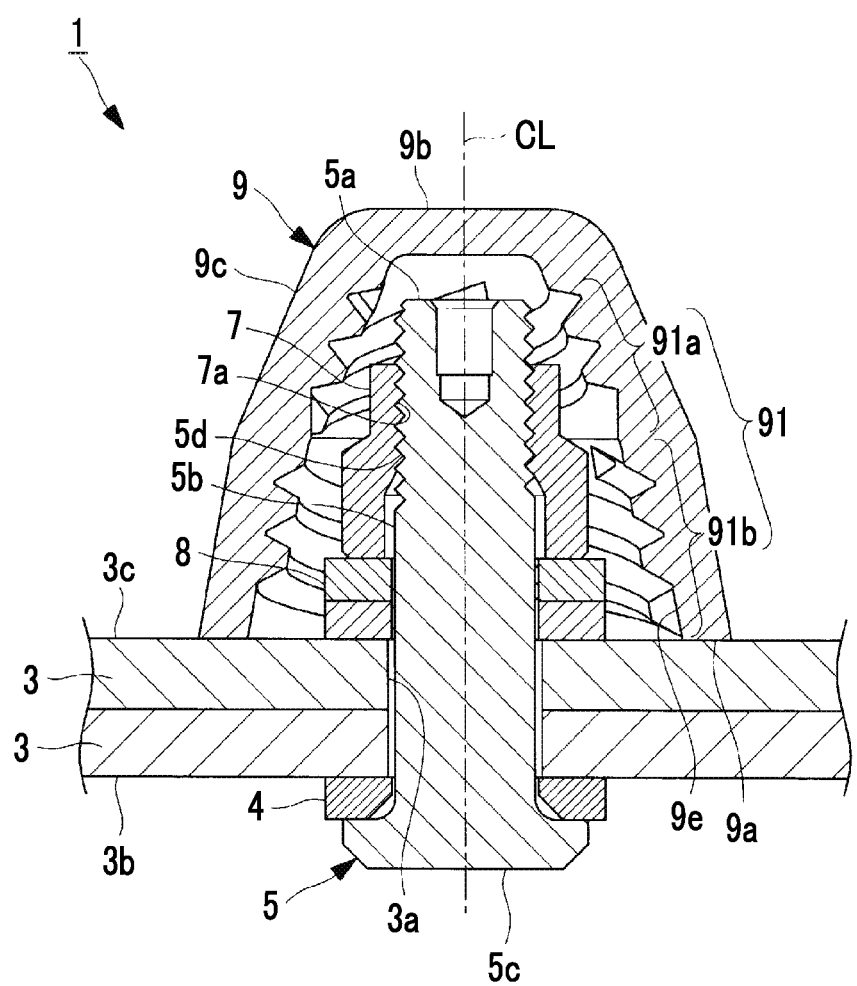
FIG. 1 is a longitudinal sectional view showing a securing structure part and a cap according to the first embodiment of the present invention.

FIG. 1 is a longitudinal sectional view showing a securing structure part 1 and a cap 9 according to the first embodiment of the present invention.

In the present embodiment, the securing structure part 1 is applied to the vicinity of a fuel tank of an aircraft, and includes a fastener 5 which passes through a through-hole 3a formed in overlapping structure elements 3 and 3 via a washer 4, a nut-shaped collar 7 which is fastened to a tip part 5a of the fastener 5 protruding from the surface of the structure elements 3 and 3 via two washers 8, and a resin cap 9 which is mounted to surround the tip part 5a of the fastener 5 and the collar 7.

For example, as the structure elements 3 and 3, there is an outer plate, a stringer, a rib, a spar, or the like of an aircraft, and the structure elements 3 and 3 are made of a metal material such as aluminum alloy, or a composite material such as Carbon Fiber Reinforced Plastic (CFRP) or Glass Fiber Reinforced Plastic (GFRP). In FIG. 1, one side surface 3b side (the lower side in FIG. 1) of the structure element 3 is the outside of the fuel tank, and the other side surface 3c side (the upper side in FIG. 1) of the structure element 3 is the inside of the fuel tank.

The fastener 5 is made of metal such as aluminum alloy or titanium alloy, and includes a shaft part 5b which extends in a center axis CL direction, and a head part 5c which is provided near the base end part of the shaft part 5b. Generally, the shaft part 5b is formed in a tubular shape, and the length of the shaft part 5b in the center axis CL direction is longer than the dimension obtained by adding the washers 4 and 8 and the collar 7 to the overlapping structure elements 3 and 3 in the axis direction.

The diameter of the head part 5c is greater than the diameter of the shaft part 5b, and is greater than the diameter of the through-hole 3a which is formed in the structure element 3. Accordingly, the head part 5c is not inserted into the through-hole 3a, and is locked to one side surface 3b side of the structure element 3 via the washer 4. A male screw groove 5d which is screwed to the collar 7 is formed on the tip part 5a side of the shaft part 5b.

The collar 7 is also made of metal such as aluminum alloy or titanium alloy, and is formed in a tubular shape in which a through-hole is formed in the center axis CL direction. A female screw groove 7a corresponding to the male screw groove 5d of the fastener 5 is formed on the inner peripheral surface defining the through-hole of the collar 7, and thus, the fastener 5 and the collar 7 are screwed to each other.

The cap 9 is injection-molded by an insulating resin material such as Poly Tetra Fluoro Ethylene (PTFE), Polyether Ether Ketone (PEEK), or Polyacetal (POM), and is formed in a cup shape which includes an opening-end part 9a having an opening on one end side and a bottom part 9b on the other end side. An outer peripheral part 9c of the cap 9 has a shape in which a diameter increases from the bottom part 9b toward the opening-end part 9a. However, the shape of the outer peripheral part 9c is not limited to this, and may be a tubular shape having the same diameter.

Figure 2:
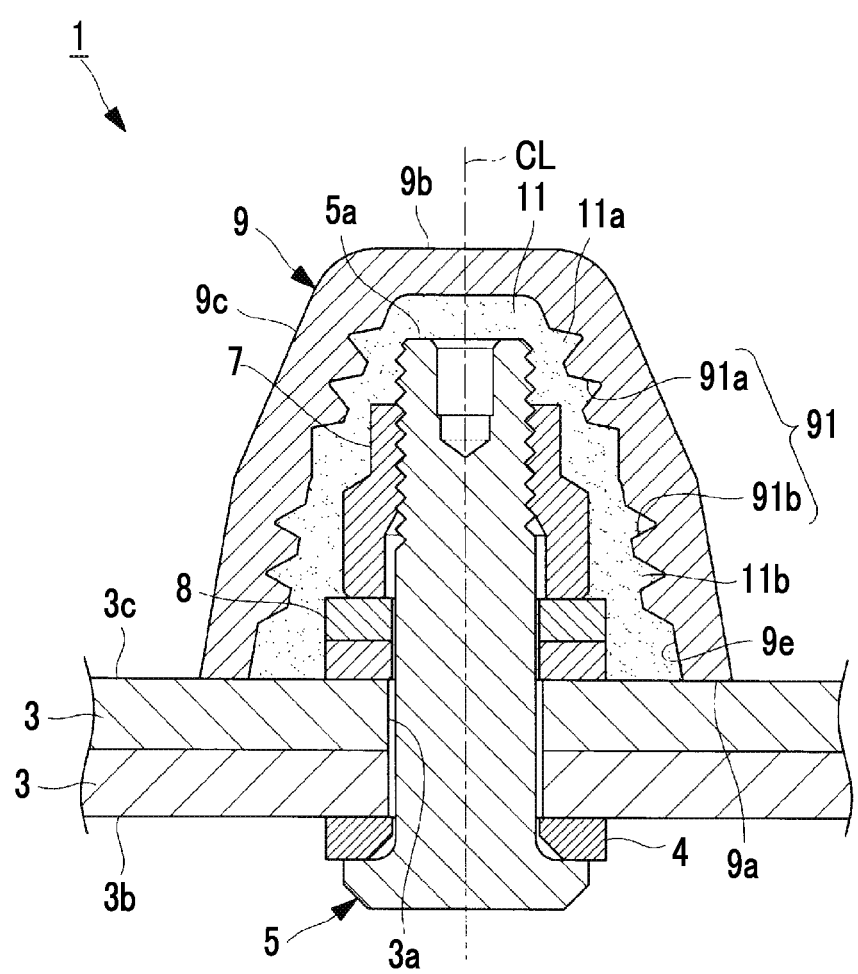
FIG. 2 is a longitudinal sectional view showing a state where a portion between a fastener and a collar, and the cap is filled with a filler agent.

The cap 9 is mounted in a non-engaged state with respect to the tip part 5a of the fastener 5 and the collar 7. That is, the cap 9 is not directly secured to the fastener 5 or the collar 7, and as shown in FIG. 2, mechanically engages with a sealant 11 (filler) which fills a space formed between the fastener 5, the collar 7, and the other side surface 3c of the structure element 3 and 3 without a gap and is cured.

Generally, as the sealant 11, an silicon-based insulating material is used, and in a case where the sealant 11 is used in a fuel tank of an aircraft, a sealant for a fuel tank is used. Instead of the sealant 11, an adhesive agent having improved chemical resistance may be used. As described below, the sealant 11 enters the inside of a groove of a filler engaging part 91 formed on an inner peripheral surface 9e of the cap 9 and is cured. Accordingly, the cap 9 and the sealant 11 mechanically engage with each other so as to be connected to each other.

In this way, the fastener 5 and the collar 7 configured of a conductive material such as metal is surrounded by the cap 9 formed of an insulating material, the inside of the cap 9 is filled with the sealant 11 which is an insulating material, and thus, it is possible to prevent spark from occurring inside a fuel tank when the fuel tank is struck by lightning.

Figure 3:
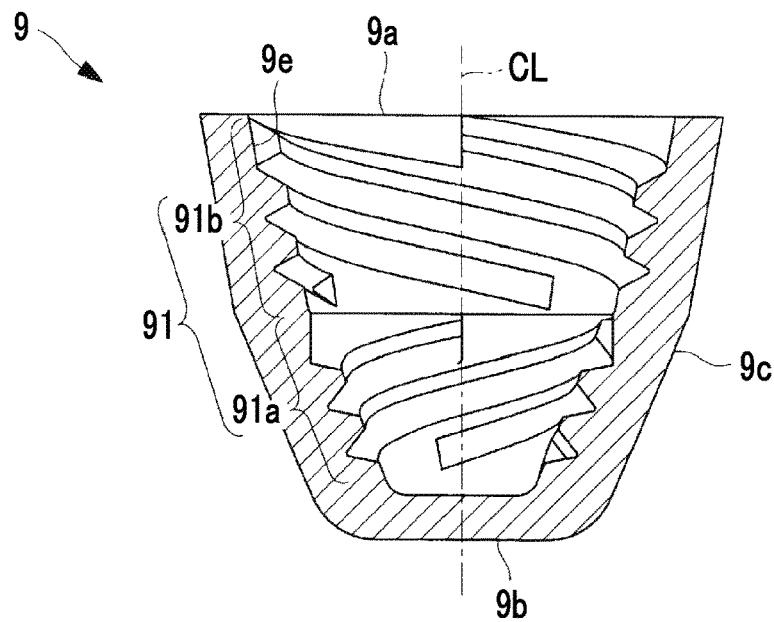
FIG. 3 is a longitudinal sectional view showing only the cap in FIG. 1 as a unit.

As shown in FIG. 3, the filler engaging part 91 which engages with the sealant 11 is formed on the inner peripheral surface 9e of the cap 9. The filler engaging part 91 has a female threaded helical shape which turns about the center axis CL (that is, the center axis CL of the fastener 5) of the cap.

Specifically, the filler engaging part 91 includes a helical engagement part 91a (first helical engagement part) which is formed in a region near the cap inner part (the inside) of the inner peripheral surface 9e of the center axis CL direction, and a helical engagement part 91b (second helical engagement part) which is formed in a region near the cap opening-end part 9a of the inner peripheral surface 9e in the center axis CL direction.

The helical engagement part 91b has a greater inner diameter than that of the helical engagement part 91a, and has a helical direction opposite to that of the helical engagement part 91a. For example, in the present embodiment, the helical engagement part 91a is a left-hand screw (reverse screw), and the helical engagement part 91b is a right-hand screw (normal screw). However, the direction relationship between the two screws may be opposite to the above-described direction relationship.

The helical engagement part 91a and the helical engagement part 91b are tapered threaded parts in which inner diameters thereof increase toward the opening-end part 9a side of the cap 9, and the minimum inner diameter of the helical engagement part 91b is set so as to be equal or more than the maximum inner diameter of the helical engagement part 91a. For example, in the present embodiment, the maximum inner diameter of the helical engagement part 91a is the same as the minimum inner diameter of the helical engagement part 91b.

Both of the helical engagement part 91a and the helical engagement part 91b have multiple threads. For example, in the present embodiment, each of the helical engagement part 91a and the helical engagement part 91b has four threads at 90° intervals in the circumferential direction.

Next, a manufacturing method of the securing structure part 1 having the above-described configuration will be described.

First, the shaft part 5b of the fastener 5 passes through the through-hole 3a formed in the overlapping structure elements 3 and 3 via the washer 4 from the tip part 5a side. After the washer 8 is mounted on the tip part 5a protruding from the other side surface 3c of the structure elements 3 and 3, the collar 7 is screwed to tip part 5a to be fastened by a predetermined torque. Accordingly, the overlapping structure elements 3 and 3 are secured to each other.

After the inside of the cap 9 is filled with the sealant 11 by a predetermined amount, the cap 9 is mounted so as to surround the tip part 5a and the fastener 5 and the collar 7. When the cap 9 is pushed into until the opening-end part 9a comes into contact with the other side surface 3c of the structure element 3, the sealant 11 filling the inside of the cap 9 flows around the fastener 5 and the collar 7, and a region surrounded by the inner peripheral surface 9e of the cap 9 and the other side surface 3c of the structure element 3 is filled with the sealant 11 without gaps. Thereafter, this state is maintained such that the sealant 11 is cured, and the cap 9 is mechanically connected to the sealant 11.

According to the present embodiment, the following effects are obtained.

The cap 9 is mounted in a non-engaged state with respect to the tip part 5a of the fastener 5 and the collar 7, the filler engaging part 91 (91a and 91b) having the female threaded helical shape formed on the inner peripheral surface 9e of the cap 9 engages with the sealant 11, and it is possible to mechanically connect the cap 9 and the sealant 11 to each other.

Accordingly, it is possible to rigidly secure the cap 9 to the fastener 5 and the collar 7 without adopting the configuration (refer to PTLs 2 and 3) of the related art in which the cap 9 is directly secured to the tip part 5a of the fastener 5.

Accordingly, unlike the related art, it is not necessary to directly screw the cap to the fastener of a special size having the extended tip part so as to secure the cap to the fastener, and the existing short fastener can be used. Therefore, an increase in cost or an increase in weight is prevented, and it is possible reduce interference risk between the cap 9 and the structure element around the cap 9.

The female threaded filler engaging part 91 formed on the inner peripheral surface 9e of the cap 9 is configured to include the helical engagement part 91a which is formed in the region near the cap inner part and the helical engagement part 91b which is formed in the region near the opening-end part 9a of the cap 9, and the helical direction of the helical engagement part 91b is opposite to that of the helical engagement part 91a.

If the sealant 11 filling the inside of the cap 9 is cured, as shown in FIG. 2, the cured sealant 11 is integrated with the first male thread portion 11a which is screwed to the helical engagement part 91*a* of the cap 9 and the second male thread portion 11*b* which is screwed to the helical engagement part 91*b*.

In this state, for example, if the helical engagement part 91*a* of the cap 9 turns in a loosening direction with respect to the first male thread portion 11*a* of the sealant 11, simultaneously, the helical engagement part 91*b* of the cap 9 turns in a fastening direction with respect to the second male thread portion 11*b* of the sealant 11. In a case where the rotation directions are opposite to the above-described rotation directions, the above-described matters are similarly generated.

Accordingly, the cap 9 cannot rotate in both the forward direction and the backward direction with respect to the cured sealant 11, and thus, it is possible to reliably prevent loosening of the cap 9.

In a case where the filler engaging part having a helical shape is formed only in one direction on the inner peripheral surface 9*e* of the cap 9 and is connected to the sealant 11 by only adhesion (adhesive force) therebetween and a case where the helical engagement parts 91*a* and 91*b* are formed in the forward direction and the backward direction on the inner peripheral surface 9*e* of the cap 9 and are connected to the sealant 11 as the present embodiment, tests for measuring torque required for loosening the cap 9 were performed by the inventors.

When the tests were performed, after the cap 9 was mounted using the sealant 11, the cap 9 were left under room temperature for 48 hours, and loosening torque was measured using a torque wrench in a state where the sealant 11 was completely cured. In addition, blasting processing or embossing processing was performed on the inner surface of the cap 9 in which the filler engaging part having a helical shape was formed only in one direction so as to form fine irregularities on the inner surface, and adhesiveness between the sealant 11 and the filler engaging part increased.

As a result, with respect to the torque required for loosening the cap in which the filler engaging part having a helical shape was formed in only one direction, the cap 9 formed of PEEK had the highest value such as 160 cN·m to 170 cN·m.

Meanwhile, in the case of the cap 9 in which the filler engaging part 91 having the helical engagement parts 91*a* and 91*b* was formed in both the forward direction and the backward direction, even when the material of the cap 9 was POM having bad adhesion with respect to the sealant 11 and blasting processing or embossing processing was not performed on the cap 9, the cap 9 had a high value such as 360 cN·m.

In this way, the reason why the torque for loosening the cap 9 in which the helical engagement parts 91*a* and 91*b* were formed in the forward direction and the backward direction had a high value is because the cap 9 was not loosened (did not fall off) until any one of the first male thread portion 11*a* and the second male thread portion 11*b* of the cured sealant 11 was sheared and destroyed regardless of the material of the cap 9, or presence or absence of the processing with respect to the inner peripheral surface 9*e*.

Meanwhile, in the cap in which the filler engaging part having a helical shape was formed in only one direction, since the loosening was prevented by only the adhesion (adhesiveness) between the filler engaging part and the sealant 11, the loosening occurred when the adhesion between the filler engaging part and the sealant was separated, and the loosening torque had a significantly low value.

Accordingly, in a case where the helical engagement parts 91*a* and 91*b* are formed in the forward direction and the backward direction on the inner peripheral surface 9*e* of the cap 9, as the material of the cap 9, it is possible to use POM or the like in which the cost is low even when the adhesiveness with respect to the sealant 11 is bad. In addition, the blasting processing or the embossing processing for increasing adhesiveness between the inner peripheral surface of the cap 9 and the sealant 11 may not performed on the inner peripheral surface 9*e* of the cap 9. Accordingly, it is possible to reduce the manufacturing cost of the cap 9.

In this way, the structure of the cap is simple, productivity thereof is improved, the manufacturing cost thereof is low, and it is possible to provide the cap 9 which can be prevented from falling off from the fastener 5.

The helical engagement part 91*a* and the helical engagement part 91*b* of the cap 9 are tapered threaded parts in which inner diameters thereof increase toward the opening-end part 9*a* side of the cap 9, and the minimum inner diameter of the helical engagement part 91*b* is set so as to be equal or more than the maximum inner diameter of the helical engagement part 91*a*.

Accordingly, after the cap 9 which is an injection-molded article is molded, it is possible to easily extract the core mold described below by which the helical engagement part 91*a* and the helical engagement part 91*b* are molded, and thus, it is possible to increase productivity with respect to the cap 9.

Since each of the helical engagement part 91*a* and the helical engagement part 91*b* has multiple threads (for example, four threads), it is possible to easily extract the core mold by which the helical engagement part 91*a* and the helical engagement part 91*b* of the cap 9 are molded after the cap is injection-molded. This is because leading angles of the helical engagement parts 91*a* and 91*b* having multiple threads are steep and the core molds can be extracted by small rotation angles (approximately 90° in the case of four threads). Accordingly, it is possible to further improve productivity with respect to the cap 9.

Figure 4:
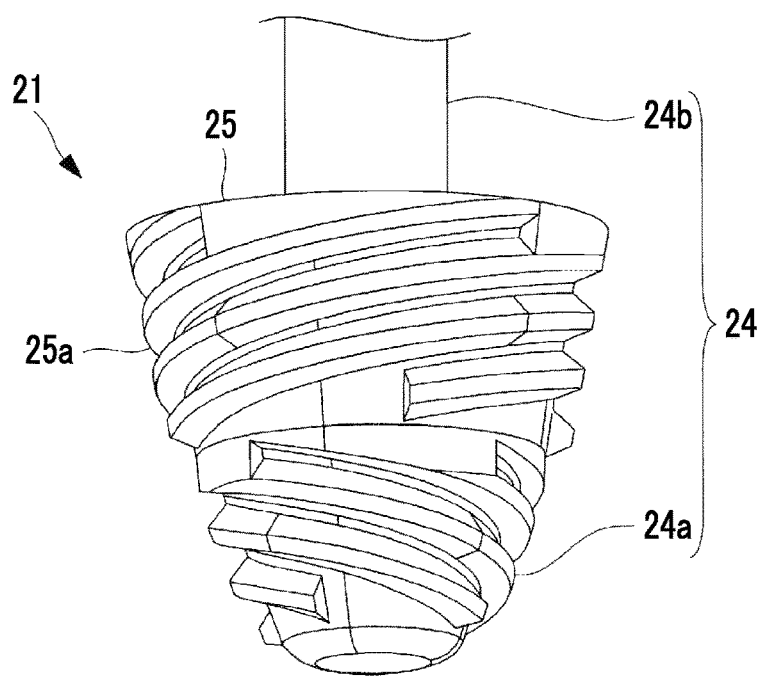
FIG. 4 is a perspective view of a core mold configuring a cap mold.
Figure 5:
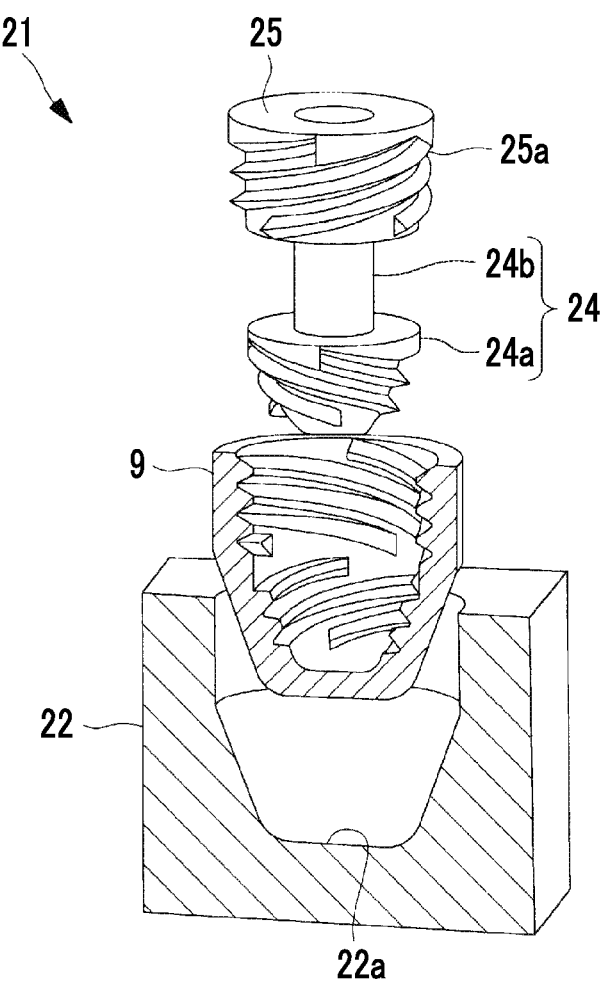
FIG. 5 is an exploded perspective view of the cap and the mold.
Figure 6:
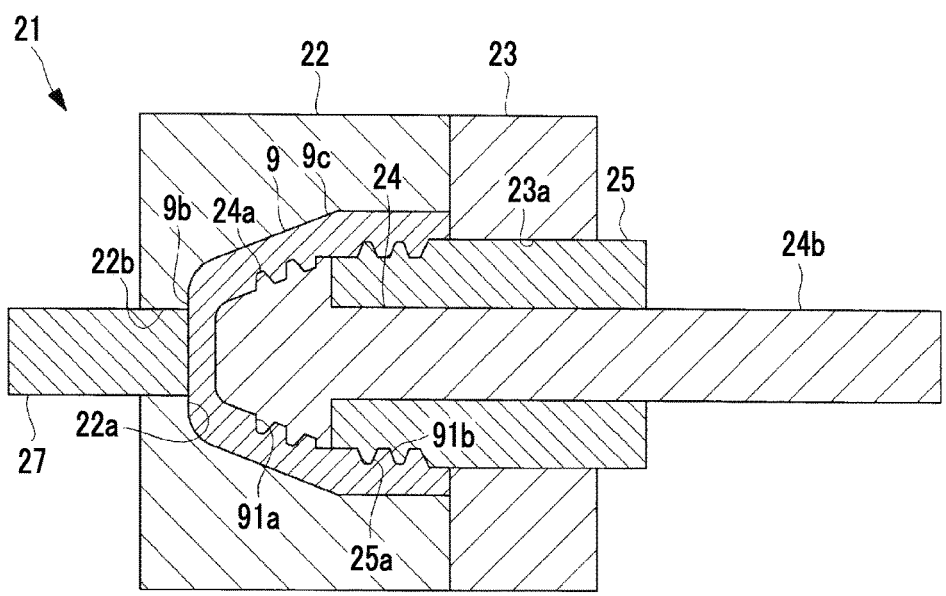
FIG. 6 is a longitudinal sectional view of the cap and the mold during injection molding.

FIG. 4 is a perspective view of the core mold configuring the mold of the cap 9. In addition, FIGS. 5 and 6 show the cap 9 and the mold thereof. Here, each of the upper side in FIG. 5 and the right side in FIG. 6 is the extraction direction of the cap 9.

A mold 21 of the cap 9 is configured to include outer molds 22 and 23 which form the outer peripheral surface of the cap 9 and core molds 24 and 25 which form the filler engaging parts 91 (91*a* and 91*b*) of the cap 9. The core mold 24 (first core mold) is a part which molds the helical engagement part 91*a*, and the core mold 25 (second core mold) is a part which molds the helical engagement part 91*b*.

The outer mold 22 has an approximately box shape, and includes a bowl-shaped cavity 22*a* which forms the outer part 9*c* and the bottom part 9*b* of the cap 9, and a sliding hole 22*b* of an eject pin 27. The outer mold 23 is mounted so as to block the cavity 22*a* of the outer mold 22. The through-hole 23*a* of the core molds 24 and 25 is formed at the position which is coaxial to the cavity 22*a*.

Meanwhile, the core mold 24 includes an approximately truncated conical shaped helical molding part 24*a*, and a columnar part 24*b* which extends from the center part of the helical molding part 24*a* toward the extraction direction side. In addition, an approximately tubular core mold 25 is tightly mounted around the columnar part 24*b*, is rotatably mounted around the columnar part 24*b*, and is slidably mounted in the axial direction. That is, the core mold 25 is coaxially disposed with the core mold 24 on the extraction direction side. A helical molding part 25*a* is formed on the tip part of the core mold 25.

As described below, in a state where the core mold 24 remains after the cap 9 is injection-molded, the core mold 25 can be extracted from the cap 9 ahead of the core mold 24, and the core mold 24 is extracted after the core mold 25 is extracted.

In a case where the cap 9 is injection-molded using the mold 21 having the above-described configuration, as shown in FIG. 6, the core molds 24 and 25 are incorporated into the inside in a state where the outer molds 22 and 23 are closed, and a resin material is injected into the inside of the cavity 22a from an injection hole (not shown) so as to perform molding. At this time, the outer peripheral part 9c and the bottom part 9b of the cap 9 are molded by the cavity 22a of the outer mold 22, and the helical engagement parts 91a and 91b of the cap 9 are molded by the core molds 24 and 25.

Figure 7:
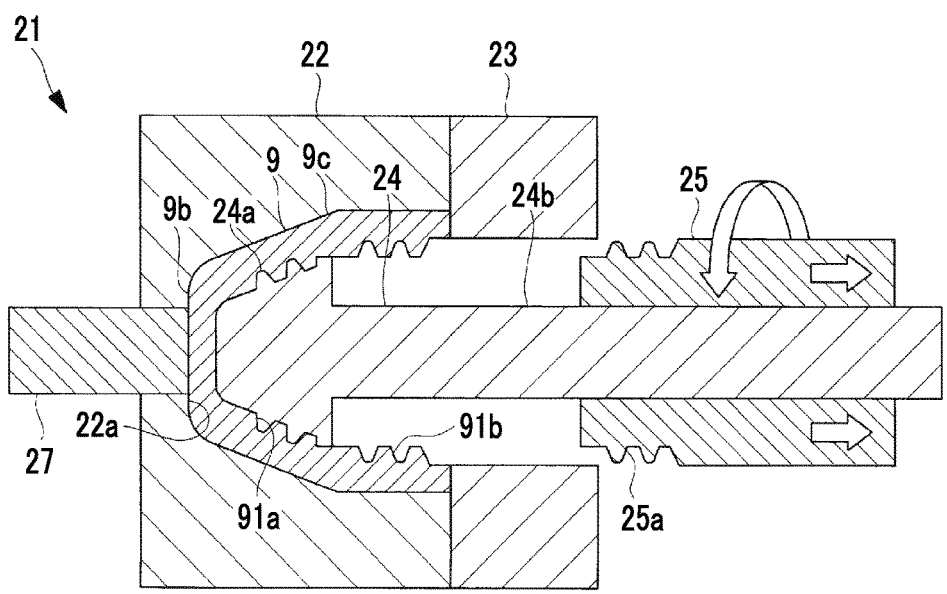
FIG. 7 is a longitudinal sectional view showing a state where a second core mold is extracted after the injection molding.

After the cap 9 is injection-molded, as shown in FIG. 7, in the state where the outer molds 22 and 23 are closed, first, the core mold 25 rotates in the counterclockwise direction so as to be removed from the helical engagement part 91b of the cap 9, and the core mold 25 is extracted outside the outer mold 22 and 23.

Figure 8:
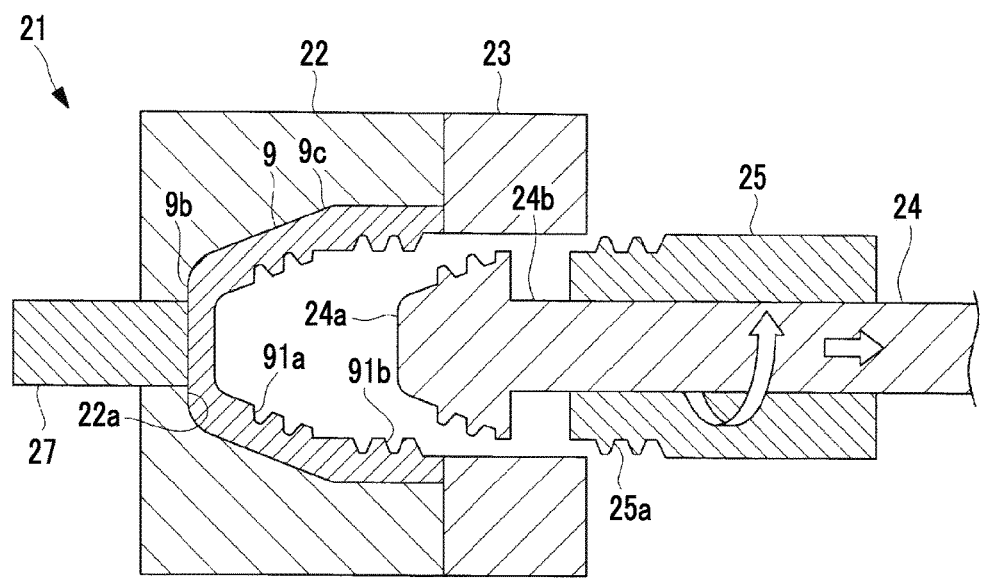
FIG. 8 is a longitudinal sectional view showing a state where a first core mold is extracted after the second core mold.

Next, as shown in FIG. 8, the core mold 24 rotates in the clockwise direction so as to be removed from the helical engagement part 91a of the cap 9, and the core mold 24 is extracted outside the outer molds 22 and 23. At this time, since the inner diameter of the helical engagement part 91b formed in the region near the opening-end part 9a of the cap 9 is greater than the inner diameter of the helical engagement part 91a formed in the region near the inner part of the cap 9, it is possible to easily extract the core mold 24 (helical molding part 24a) by which the helical engagement part 91a is molded without interfering with the helical engagement part 91b. Accordingly, productivity is improved.

Figure 9:
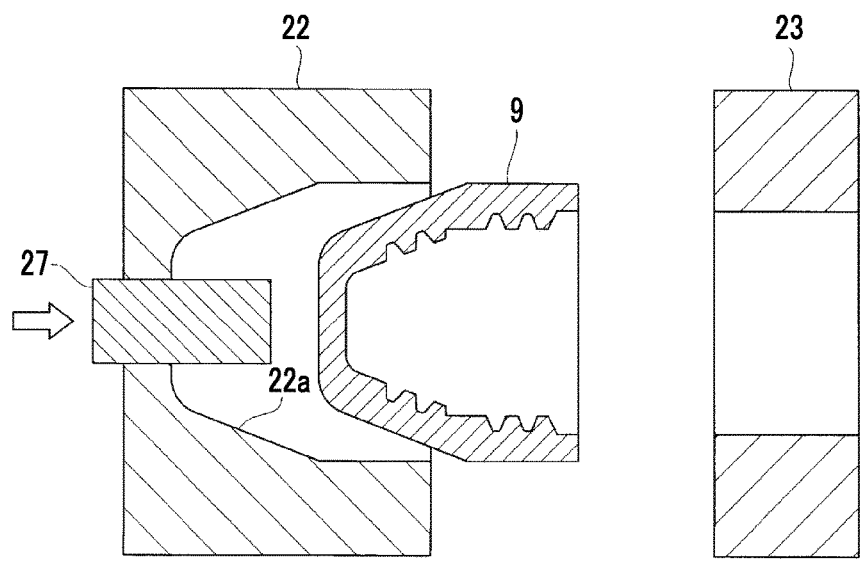
FIG. 9 is a longitudinal sectional view showing a state where an outer mold is open and the cap is extracted.

Finally, as shown in FIG. 9, the outer molds 22 and 23 are open, the eject pin 27 protrude into the cavity 22a of the outer mold 22, the cap 9 is pushed from the cavity 22a of the outer mold 22, and the cap 9 is completed.

According to the mold 21, the helical engagement part 91a and the helical engagement part 91b having helical directions different from each other can be simultaneously molded in the cap 9, and it is possible to increase productivity with respect to the cap 9. In addition, since the core mold 25 is coaxially disposed with the core mold 24, it is possible to accurately form the helical engagement parts 91a and 91b of the cap 9 to be coaxial with each other.

[Second Embodiment]

Next, a second embodiment of the present invention will be described with reference to FIGS. 10 to 12.

Figure 10:
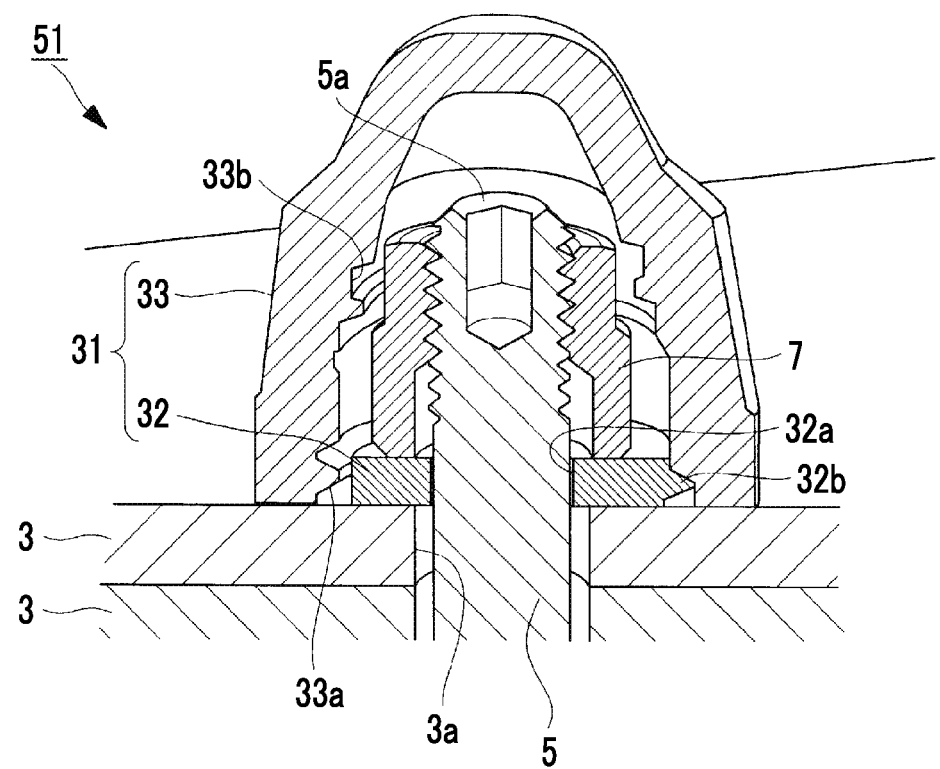
FIG. 10 is a longitudinal sectional view showing a securing structure part and a cap according to a second embodiment of the present invention.

FIG. 10 is a longitudinal sectional view showing a securing structure part 51 and a cap 31 according to a second embodiment of the present invention.

Similarly to the securing structure part 1 in the first embodiment, in the securing structure part 51, the fastener 5 passes through the through-hole 3a which is formed in the overlapping structure elements 3 and 3, and the nut-shaped collar 7 is fastened to the tip part 5a of the fastener 5 protruding from the surface of the structure elements 3 and 3 via a dedicated cap engagement washer 32. A resin cap body 33 is mounted so as to surround the tip part 5a of the fastener 5, the cap engagement washer 32, and the collar 7.

As described above, the cap 31 includes the dedicated cap engagement washer 32 which is interposed between the surface of the structure elements 3 and 3, and the collar 7, and the cap body 33.

Figure 11:
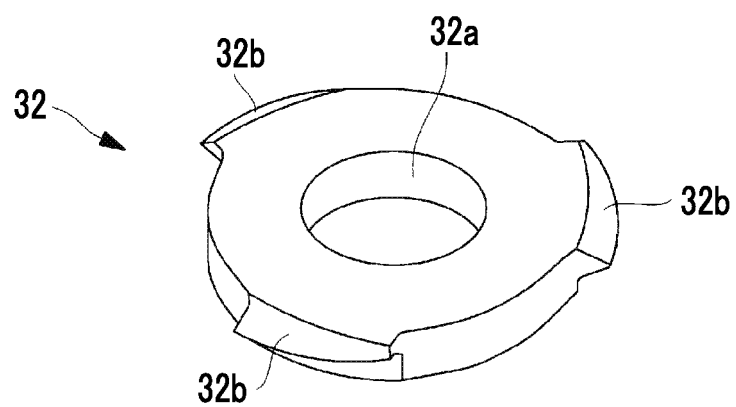
FIG. 11 is a perspective view showing only a cap engagement washer in FIG. 10 as a unit.

As shown in FIG. 11, similarly to a general washer, the cap engagement washer 32 has a through-hole 32a, through which the fastener 5 passes, at the center part of the washer 32. In addition, fin-shaped male helical engagement parts 32b having shallow leading angles are integrally formed on the periphery of the cap engagement washer 32. Each of the male helical engagement parts 32b functions as threads of a discontinuous male screw, and for example, three male helical engagement parts 32b are provided in the circumferential direction at 120° intervals. Accordingly, the male helical engagement part 32b is considered as a very short male screw having three threads.

Figure 12:
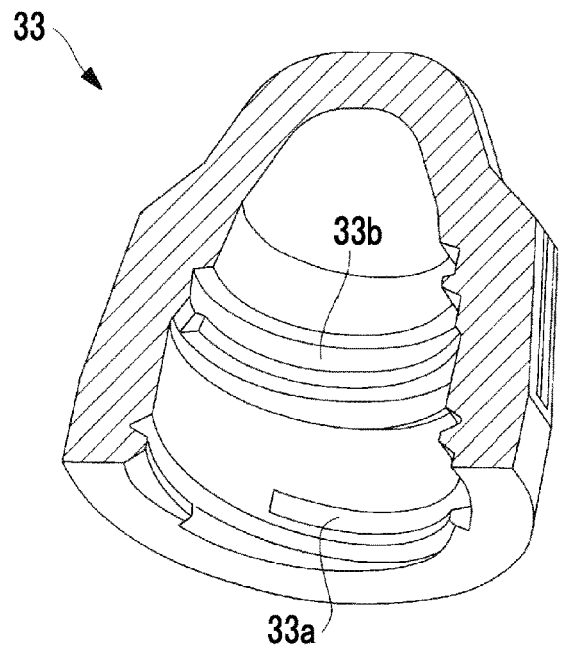
FIG. 12 is a longitudinal sectional perspective view showing only a cap body in FIG. 10 as a unit.

Meanwhile, as shown in FIG. 12, the cap body 33 has approximately the same shape as that of the cap 9 in the first embodiment, and similarly to the cap 9, is injection-molded by an insulating resin material such as PTFE, PEEK, or POM. The cap body 33 is mounted in a non-engaged state with respect to the tip part 5a of the fastener 5 and the collar 7. A female helical engagement part 33a which is formed on the inner peripheral surface near the opening-end part of the cap body 33 is secured to the male helical engagement parts 32b of the cap engagement washer 32 so as to cover the tip part 5a of the fastener 5 and the collar 7. The female helical engagement part 33a is a short female screw having three threads.

A filler engaging part 33b is formed on the inner peripheral surface closer to the inner part of the cap body 33 than the female helical engagement part 33a. The filler engaging part 33b has a female threaded helical shape which turns about the center axis of the cap body 33, and the helical direction thereof is opposite to that of the female helical engagement part 33a. For example, in the present embodiment, the female helical engagement part 33a is a right-hand screw (normal screw), and the filler engaging part 33b is a left-hand screw (reverse screw). In the second embodiment, in the filler engaging part 33b, two or three threaded helical grooves are formed at the approximately intermediate portion in the height direction of the cap body 33 at short widths. However, the filler engaging part 33b may be formed at wider widths. The filler engaging part 33b mechanically engages with a sealant (not shown) which fills the space formed between the fastener 5 and the collar 7, and the surface of the structure element 3 and is cured.

Next, a method for assembling the securing structure part 51 having the above-described configuration will be described.

First, the tip part 5a of the shaft part 5b of the fastener 5 passes through the through-hole 3a which is formed in the overlapping structure elements 3 and 3. After the cap engagement washer 32 is mounted on the tip part 5a protruding from the other side surface 3c of the structure elements 3 and 3, the collar 7 is screwed and is fastened by predetermined torque. Accordingly, the overlapping structure elements 3 and 3 are secured to each other.

After a sealant (filler) (not shown) fills the inside of the cap body 33 by a predetermined amount, and the cap body 33 is mounted so as to surround the tip part 5a of the fastener 5, the collar 7, and the cap engagement washer 32. At this time, the cap body 33 is twisted at approximately 100° to 120° in the clockwise direction, and thus, the female helical engagement part 33a of the cap body 33 engages with the male helical engagement part 32b of the cap engagement washer 32, and the cap body 33 is secured to the fastener 5.

As described above, when the cap body 33 is pushed into from the tops of the fastener 5 and the collar 7, the sealant filling the inside of the cap body 33 flows around the fastener 5 and the collar 7, and a region surrounded by the inner peripheral surface of the cap body 33 and the structure element 3 is filled with the sealant 11. The sealant also fills the inside of the female threaded filler engaging part 33b formed on the inner peripheral surface of the cap body 33. Thereafter, the sealant is cured, and the cap body 33 is mechanically connected to the sealant 11.

According to the present embodiment, the following effects are obtained.

That is, the cap body 33 engages with only the cap engagement washer 32 and does not engage with the fastener 5 and the collar 7. Accordingly, unlike the related art, it is not necessary to directly screw the cap to the fastener of a special size having the extended tip part so as to secure the cap to the fastener. Accordingly, since the existing short fastener is used, an increase in cost or an increase in weight is prevented, interference risk between the cap body 33 and the structure element around the cap body 33 is reduced, and it is possible to prevent the cap body 33 from falling off from the fastener by a simple and inexpensive configuration.

The cap body 33 engages with the cap engagement washer 32, and simultaneously, the cap body 33 is secured to the fastener 5 and the collar 7 so as to be coaxially positioned. Accordingly, it is not necessary to hold the cap body until the sealant filling the inside of the cap body 33 is cured. Therefore, it is possible to prevent the cap body 33 from being deviated from the axis with respect to the fastener 5 during curing of the filler, or from falling off from the fastener 5, and it is possible to remarkably improve mounting workability of the cap body 33.

The filler engaging part 33b, which is formed on the inner peripheral surface closer to the inner part of the cap body 33 than the female helical engagement part 33a, mechanically engages with the sealant which fills the inside of the cap body 33 and is cured. Since the helical direction of the filler engaging part 33b is opposite to the helical direction of the female helical engagement part 33a, for example, if the female helical engagement part 33a of the cap body 33 turns in the loosening direction with respect to the male helical engagement part 32b of the cap engagement washer 32 in a state where the sealant is cured, the filler engaging part 33b of the cap body 33 turns in the fastening direction with respect to the cured sealant. The opposite case also is similar.

Accordingly, the cap body 33 cannot rotate in both the forward direction and the backward direction with respect to the fastener 5 and collar 7, and thus, it is possible to reliably prevent loosening of the cap body 33.

Since each of the male helical engagement parts 32b of the cap engagement washer 32 and the female helical engagement part 33a of the cap body 33 has multiple threads, it is possible to decrease the rotation angle of the cap body 33 when the cap body 33 is attached to the cap engagement washer 32, and it is possible to improve attachment/detachment property of the cap body 33.

As a modification example of the embodiment, the cap engagement washer 32 may be integrated with the collar 7, or may be integrally provided with the collar 7.

[Third Embodiment]

Next, a method for mounting a cap according to a third embodiment of the present invention will be described.

Figure 13:
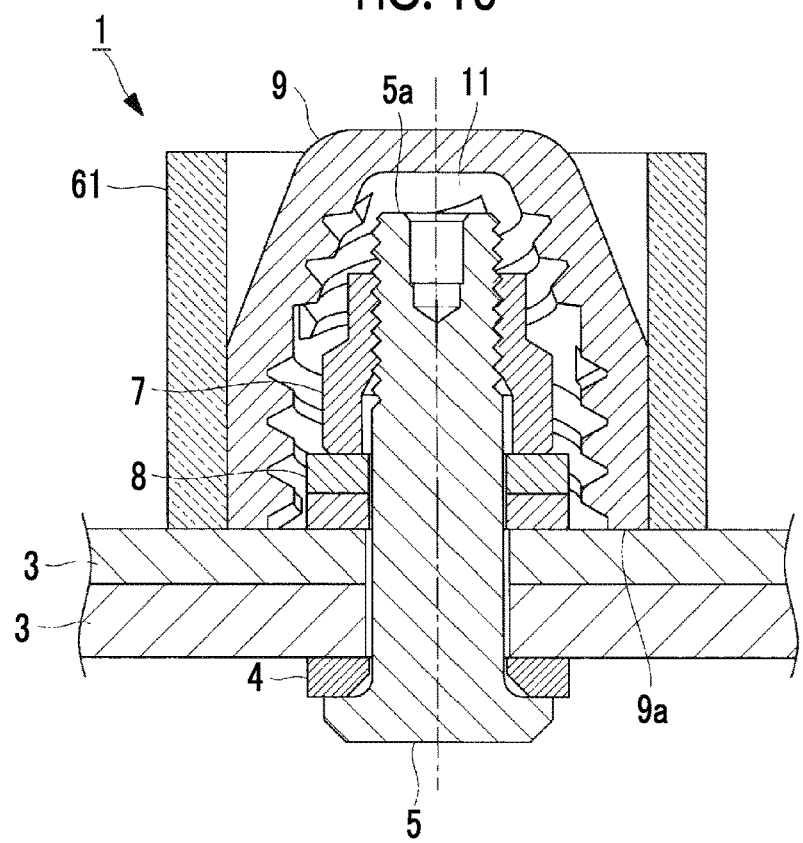
FIG. 13 is a longitudinal sectional view of a securing structure part and a cap showing a method for mounting a cap according to a third embodiment of the present invention.

For example, FIG. 13 is a longitudinal sectional view showing a method for mounting the cap 9 in the securing structure part 1 described in the first embodiment. In addition, this method for mounting a cap may be applied to the securing structure part 51 described in the second embodiment.

In the method for mounting a cap, a thick resin sleeve 61 (masking member) is tightly mounted around the cap 9. As the material of the resin sleeve 61, a material which has low adhesiveness with respect to the sealant and appropriate elasticity, and is transparent or translucent is preferable, and for example, polypropylene is appropriate. The inner diameter of the resin sleeve 61 is set so as to be lightly fastened to the outer peripheral surface of the cap 9.

Figure 14:
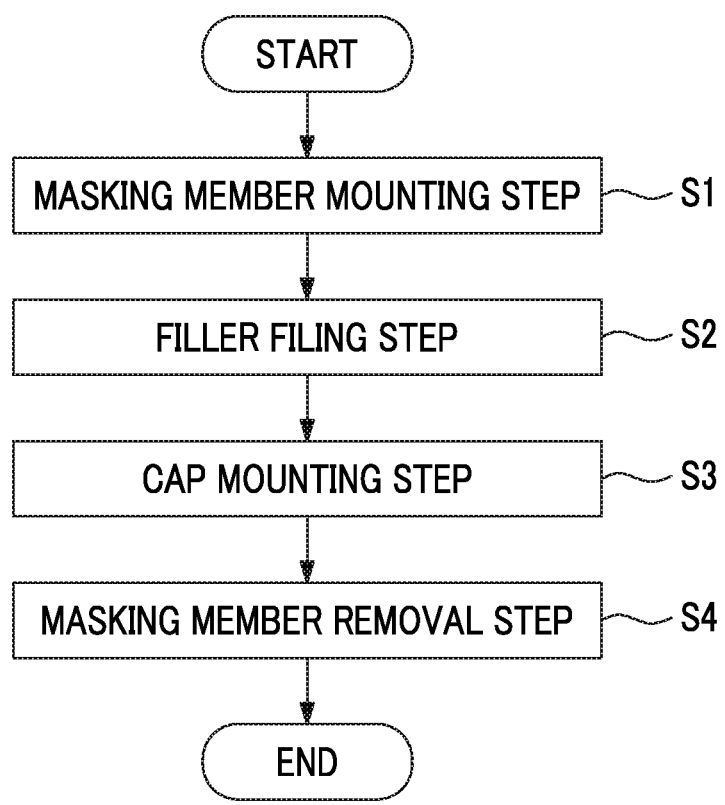
FIG. 14 is a flowchart showing a flow of a process for mounting the cap.

As shown in a flowchart of FIG. 14, the method for mounting the cap 9 includes a masking member mounting step S1 of mounting the resin sleeve 61 which is a masking member on the outer peripheral surface of the cap 9, a filler filing step S2 of filling the inside of the cap 9 with a filler such as the sealant 11, a cap mounting step S3 of mounting the cap 9 on the tip part 5a of the fastener 5 and the collar 7, and a masking member removal step S4 of removing the resin sleeve 61 from the cap 9 after the sealant 11 is cured.

In the masking member mounting step S1, the resin sleeve 61 is mounted such that one end thereof aligns with the opening-end part 9a of the cap 9.

In the filler filling step S2 and the cap mounting step S3, even when the sealant 11 filling the inside of the cap 9 protrude toward the outside and is attached to the outer peripheral surface of the resin sleeve 61, it is not necessary particularly wipe off the attached sealant 11, and it is possible to simply peel off the attached sealant 11 from the resin sleeve 61 after the sealant 11 is cured.

In the masking member removal step S4, in view of operation efficiency, it is preferable to remove the resin sleeve 61 from the cap 9 after the sealant 11 attached to the outer peripheral surface of the resin sleeve 61 is cured. However, the resin sleeve 61 may be removed before the sealant 11 is cured.

In this way, according to the method of mounting the cap 9 of the mounting the resin sleeve 61 so as to mask the outer peripheral surface of the cap 9, even though the sealant 11 filling the inside of the cap 9 protrudes toward the outside when the cap 9 filled with the sealant is mounted on the fastener 5 and the collar 7, the protruded sealant 11 is attached to the resin sleeve 61 mounted on the outer peripheral surface of the cap 9. Accordingly, it is possible to remove the resin sleeve 61, to which the sealant 11 is attached, for each resin sleeve from the cap 9 after the cap 9 is mounted on the fastener 5 and the collar 7.

Therefore, when the cap 9 is mounted on the fastener 5 using the sealant 11, unlike the related art, it is not necessary to carefully wipe off the sealant 11 protruding from the cap 9, and it is possible to decrease man-hours.

Since the resin sleeve 61 can be repeatedly used, it is economical. In addition, since the mounting operation and the removal operation of the resin sleeve 61 with respect to the cap 9 are simple, large man-hours are not required. Accordingly, it is possible to inexpensively and easily prevent dirt of the cap 9 due to attachment of the sealant 11.

[Fourth Embodiment]

Next, a method of mounting a cap according to a fourth embodiment of the present invention will be described.

Figure 15:
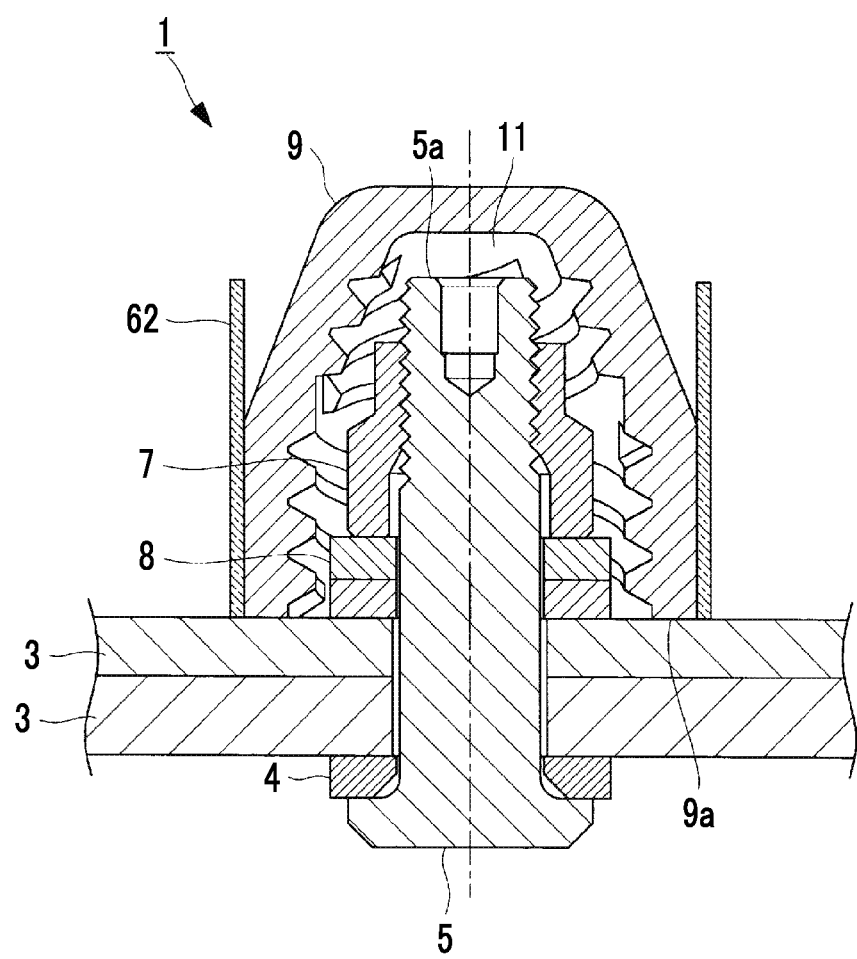
FIG. 15 is a longitudinal sectional view of a securing structure part and a cap showing a method for mounting a cap according to a fourth embodiment of the present invention.

FIG. 15 shows an example in which a thin film sleeve instead of the thick resin sleeve 61 in the third embodiment (refer to FIG. 13) is mounted on the outer peripheral surface of the cap 9. This film sleeve 62 may be a disposable sleeve. Other configurations and procedures are similar to those of the third embodiment. Here, similarly to the case of the third embodiment, it is possible to simply prevent dirt due to the sealant 11 protruding and being attached to the outer peripheral surface of the cap 9.

As described above, according to the caps 9 and 31, the cap mold 21, and the securing structure parts 1 and 51 using a cap according to the present embodiment, the structures thereof are simple and have improved productivity and low manufacturing cost, and it is possible to the cap 9 and 31 from falling off from the fastener 5.

According to the method for mounting a cap of the present embodiment, when the cap 9 (31) is mounted on the fastener 5 using the sealant 11, it is possible to easily prevent the sealant 11, which protrudes from the cap 9(31), from being attached to the periphery of the cap 9(31).

The present invention is not limited to the configurations of the above-described embodiments, modifications or improvements may be appropriately applied within a scope which does not depart from the gist of the present invention, the applied field may be modified, and embodiment to which the modifications or improvement are applied also are included in the extent of rights of the present invention.

REFERENCE SIGNS LIST

1, 51: securing structure part
3: structure element
3*a*: through-hole
5: fastener
5*a*: tip part of fastener
7: collar
9: cap
9*a*: cap opening-end part
11: sealant (filler)
21: mold
22, 23: outer mold
24: core mold (first core mold)
25: core mold (second core mold)
31: cap
32: cap engagement washer
32*b*: male helical engagement part
33: cap body
33*a*: female helical engagement part
33*b*: filler engaging part
61: resin sleeve (masking member)
62: film sleeve (masking member)
91: filler engaging part
91*a*: helical engagement part (first helical engagement part)
91*b*: helical engagement part (second helical engagement part)
CL: center axis
S1: masking member mounting step
S2: filler filling step
S3: cap mounting step
S4: masking member removal step

The invention claimed is:

1. A cap which is applied to a securing structure part for securing structure elements using a fastener which passes through a through-hole formed in overlapping multiple structure elements of an aircraft and a collar which is fastened to a tip part of the fastener protruding from a surface of the structure elements, and which is mounted to surround the tip part of the fastener and the collar,
    wherein the cap is mounted in a non-engaged state with respect to the tip part of the fastener and the collar,
    wherein a filler engaging part which is formed on an inner peripheral surface of the cap, has a female threaded helical shape which turns about a center axis of the cap, and engages with a filler which fills a space formed between the inner peripheral surface, and the fastener, the collar, and the surface of the structure element and is cured,
    wherein the female threaded helical shape includes:
        a first helical engagement part which is formed in a region near a cap inner part of the inner peripheral surface in a center axis direction; and
        a second helical engagement part which is formed in a region near a cap opening-end part of the inner peripheral surface in the center axis direction, has a greater inner diameter than that of the first helical engagement part, and has a helical direction which is opposite to that of the first helical engagement part.

2. The cap according to claim 1,
    wherein at least one of the first helical engagement part and the second helical engagement part is a tapered threaded part in which the inner diameter increases toward an opening-end part side of the cap, and
    wherein a minimum inner diameter of the second helical engagement part is equal to or more than a maximum inner diameter of the first helical engagement part.

3. The cap according to claim 1,
    wherein at least one of the first helical engagement part and the second helical engagement part has multiple threads.

4. A securing structure part which includes a fastener which passes through a through-hole formed in overlapping multiple structure elements of an aircraft, a collar which is fastened to a tip part of the fastener protruding from a surface of the structure elements, and a cap which is mounted to surround the tip part of the fastener and the collar, and which secures the structure elements using the fastener and the collar,
    wherein the cap is mounted in a non-engaged state with respect to the tip part of the fastener and the collar,
    wherein a filler engaging part is formed on an inner peripheral surface of the cap, and the filler engaging part has a female threaded helical shape which turns about a center axis of the cap, and engages with a filler which fills a space formed between the inner peripheral surface, and the fastener, the collar, and the surface of the structure element and is cured, and
    wherein the female threaded helical shape includes:
        a first helical engagement part which is formed in a region near a cap inner part of the inner peripheral surface in a center axis direction; and
        a second helical engagement part which is formed in a region near a cap opening-end part of the inner peripheral surface in the center axis direction, has a greater inner diameter than that of the first helical engagement part, and has a helical direction which is opposite to that of the first helical engagement part.

* * * * *